United States Patent
Quaretti et al.

(10) Patent No.: US 11,247,869 B2
(45) Date of Patent: Feb. 15, 2022

(54) SYSTEMS AND METHODS FOR PROVIDING INFORMATION REGARDING ELEVATOR SYSTEMS

(71) Applicant: Otis Elevator Company, Farmington, CT (US)

(72) Inventors: Bruno Quaretti, Nevoy (FR); Eric Vaunois, Briare (FR)

(73) Assignee: OTIS ELEVATOR COMPANY, Farmington, CT (US)

( * ) Notice: Subject to any disclaimer, the term of this patent is extended or adjusted under 35 U.S.C. 154(b) by 616 days.

(21) Appl. No.: 16/184,208

(22) Filed: Nov. 8, 2018

(65) Prior Publication Data

US 2019/0144239 A1 May 16, 2019

(30) Foreign Application Priority Data

Nov. 10, 2017 (EP) .................................... 17306559

(51) Int. Cl.
*B66B 3/00* (2006.01)
*H04W 4/33* (2018.01)
(Continued)

(52) U.S. Cl.
CPC ............... *B66B 3/008* (2013.01); *B66B 1/52* (2013.01); *B66B 3/002* (2013.01); *B66B 19/007* (2013.01); *H04W 4/33* (2018.02)

(58) Field of Classification Search
CPC .......... B66B 3/00; B66B 3/008; B66B 3/006; B66B 3/002; B66B 1/468; B66B 1/52
See application file for complete search history.

(56) References Cited

U.S. PATENT DOCUMENTS 6,082,500 A * 7/2000 Amo .................... B66B 1/34
    187/391
6,941,248 B2   9/2005 Friedrich et al.
(Continued)

FOREIGN PATENT DOCUMENTS

CN   106698119 A   5/2017
CN   106882658 A   6/2017
(Continued)

OTHER PUBLICATIONS

European Search Report, EP Application No. 17306559.0, dated May 23, 2018, European Patent Office; EP Search Report 7 pages.
(Continued)

*Primary Examiner* — Marlon T Fletcher
(74) *Attorney, Agent, or Firm* — Cantor Colburn LLP

(57) ABSTRACT

Elevator systems having an elevator car located within an elevator shaft, the elevator car moveable between a plurality of floors of a building, a car operating panel located within the elevator car and having a plurality of buttons operable for selection of a destination floor of the plurality of floors, a digital readable marker located within the elevator car that is at least one of scannable and readable by a user device, and a digital storage system having information stored thereon, the information including directory information, wherein the directory information includes information associated with the floors selectable by operation of the plurality of buttons. When a user device scans or reads the digital readable marker, the digital storage system transmits the directory information to the user device so that the user device can display the directory information to a passenger.

13 Claims, 7 Drawing Sheets

(51) Int. Cl.
*B66B 1/52* (2006.01)
*B66B 19/00* (2006.01)

(56) References Cited

U.S. PATENT DOCUMENTS

| | | | |
|---|---|---|---|
| 8,676,623 B2 | 3/2014 | Gale et al. | |
| 9,240,059 B2 | 1/2016 | Zises | |
| 9,304,003 B1 | 4/2016 | Ashman et al. | |
| 9,449,343 B2 | 9/2016 | Mayerle et al. | |
| 9,472,159 B2 | 10/2016 | Uusitalo et al. | |
| 9,539,164 B2 | 1/2017 | Sanders et al. | |
| 10,732,721 B1* | 8/2020 | Clements | G06F 3/167 |
| 2009/0273561 A1 | 11/2009 | Matsumoto | |
| 2012/0194554 A1 | 8/2012 | Kaino et al. | |
| 2012/0240351 A1 | 9/2012 | Bienek et al. | |
| 2012/0253658 A1 | 10/2012 | Kappeler | |
| 2013/0212046 A1* | 8/2013 | Henshue | E01C 11/222 |
| | | | 705/500 |
| 2013/0293586 A1 | 11/2013 | Kaino et al. | |
| 2014/0339296 A1* | 11/2014 | McAdams | G06F 16/9554 |
| | | | 235/375 |
| 2015/0036912 A1 | 2/2015 | Bizzi et al. | |
| 2015/0048953 A1* | 2/2015 | Murphy, Jr. | G08B 25/14 |
| | | | 340/691.6 |
| 2015/0204678 A1* | 7/2015 | Schuster | G07C 9/28 |
| | | | 701/522 |
| 2015/0317060 A1* | 11/2015 | Debets | G06Q 30/0267 |
| | | | 715/835 |
| 2016/0071149 A1 | 3/2016 | Farshori | |
| 2016/0232687 A1 | 8/2016 | Morand et al. | |
| 2018/0253430 A1* | 9/2018 | Grigorescu | G06F 16/44 |
| 2018/0282116 A1* | 10/2018 | Tschuppert | B66B 1/461 |
| 2019/0144239 A1* | 5/2019 | Quaretti | B66B 3/002 |
| | | | 187/396 |
| 2020/0242284 A1* | 7/2020 | Schierenbeck | B66B 9/08 |
| 2020/0307959 A1* | 10/2020 | Felis | B66B 9/08 |

FOREIGN PATENT DOCUMENTS

| | | |
|---|---|---|
| EP | 1870367 A1 | 12/2007 |
| JP | 2015228072 A | 12/2015 |
| WO | 2007066166 A1 | 6/2007 |
| WO | 2017055054 A1 | 4/2017 |
| WO | 2017064637 A2 | 4/2017 |

OTHER PUBLICATIONS

Veenhof, Sander "Be warned. There's a patent on that behaviour", [Retrieved from the internet: https://medium.com/@beyourownrobot/patenting-behaviour-fd44010324a1], Oct. 2, 2017; 6 pages.

* cited by examiner

SYSTEMS AND METHODS FOR PROVIDING INFORMATION REGARDING ELEVATOR SYSTEMS

CROSS REFERENCE TO RELATED APPLICATIONS

This application claims the benefit of European Application No. 17306559.0, filed Nov. 10, 2017, which is incorporated herein by reference in its entirety.

BACKGROUND

The subject matter disclosed herein generally relates to elevator systems and, more particularly, to systems and methods for providing information to passengers regarding the elevator system.

User interface components, such as kiosks, elevator car operating panels, and call buttons, are typically offered as standardized products. The designs of such user interface components are limited to a small product family while balancing product portfolio with manufacturing and maintenance costs. It may be advantageous to provide improved options for user interfaces to enable improved user experience.

SUMMARY

According to some embodiment, elevator systems are provided. The elevator systems include an elevator car located within an elevator shaft, the elevator car moveable between a plurality of floors of a building, a car operating panel located within the elevator car and having a plurality of buttons operable for selection of a destination floor of the plurality of floors, a digital readable marker located within the elevator car that is at least one of scannable and readable by a user device, and a digital storage system having information stored thereon, the information including directory information, wherein the directory information includes information associated with the floors selectable by operation of the plurality of buttons. When a user device scans or reads the digital readable marker, the digital storage system transmits the directory information to the user device so that the user device can display the directory information to a passenger.

In addition to one or more of the features described herein, or as an alternative, further embodiments of the elevator systems may include that the information stored on the digital storage system is updatable based on changes related to each of the plurality of floors.

In addition to one or more of the features described herein, or as an alternative, further embodiments of the elevator systems may include that the information transmitted from the digital storage system includes information to enable augmented reality display of the directory information.

The elevator system of any preceding claim, In addition to one or more of the features described herein, or as an alternative, further embodiments of the elevator systems may include that transmitted from the digital storage system includes data enabling interactive elements to be displayed by the user device.

In addition to one or more of the features described herein, or as an alternative, further embodiments of the elevator systems may include that the information transmitted from the digital storage system further includes expandable information to provide additional information displayed by the user device.

In addition to one or more of the features described herein, or as an alternative, further embodiments of the elevator systems may include that the digital readable marker is located on the car operating panel.

In addition to one or more of the features described herein, or as an alternative, further embodiments of the elevator systems may include that the information stored on the digital storage system and transmitted to the user device includes audio information associated with the directory information, wherein the user device can generate audio based on received audio information.

In addition to one or more of the features described herein, or as an alternative, further embodiments of the elevator systems may include that the digital readable marker is at least one of a barcode, a matrix barcode, a two-dimensional code, a scannable image, and an alphanumeric code.

According to some embodiments, methods of providing information associated with an elevator system to a passenger within an elevator car are provided. The methods include installing a digital readable marker within the elevator car, storing information associated with at least one floor of a plurality of floors of a building on a digital storage system, receiving a request from a user device when the user device reads or scans the digital readable marker, and transmitting information to the user device in response to the request, wherein the information includes directory information to be displayed by the user device for a passenger within the elevator car.

In addition to one or more of the features described herein, or as an alternative, further embodiments of the methods may include that the information stored on the digital storage system is updatable based on changes related to each of the plurality of floors.

In addition to one or more of the features described herein, or as an alternative, further embodiments of the methods may include that the information transmitted from the digital storage system includes information to enable augmented reality display of the directory information.

In addition to one or more of the features described herein, or as an alternative, further embodiments of the methods may include that the information transmitted from the digital storage system includes data enabling interactive elements to be displayed by the user device.

In addition to one or more of the features described herein, or as an alternative, further embodiments of the methods may include that the information transmitted from the digital storage system further includes expandable information to provide additional information displayed by the user device.

In addition to one or more of the features described herein, or as an alternative, further embodiments of the methods may include that the digital readable marker is located on a car operating panel of the elevator car.

In addition to one or more of the features described herein, or as an alternative, further embodiments of the methods may include that the transmitted information includes audio information associated with the directory information, wherein the user device can generate audio based on received audio information.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
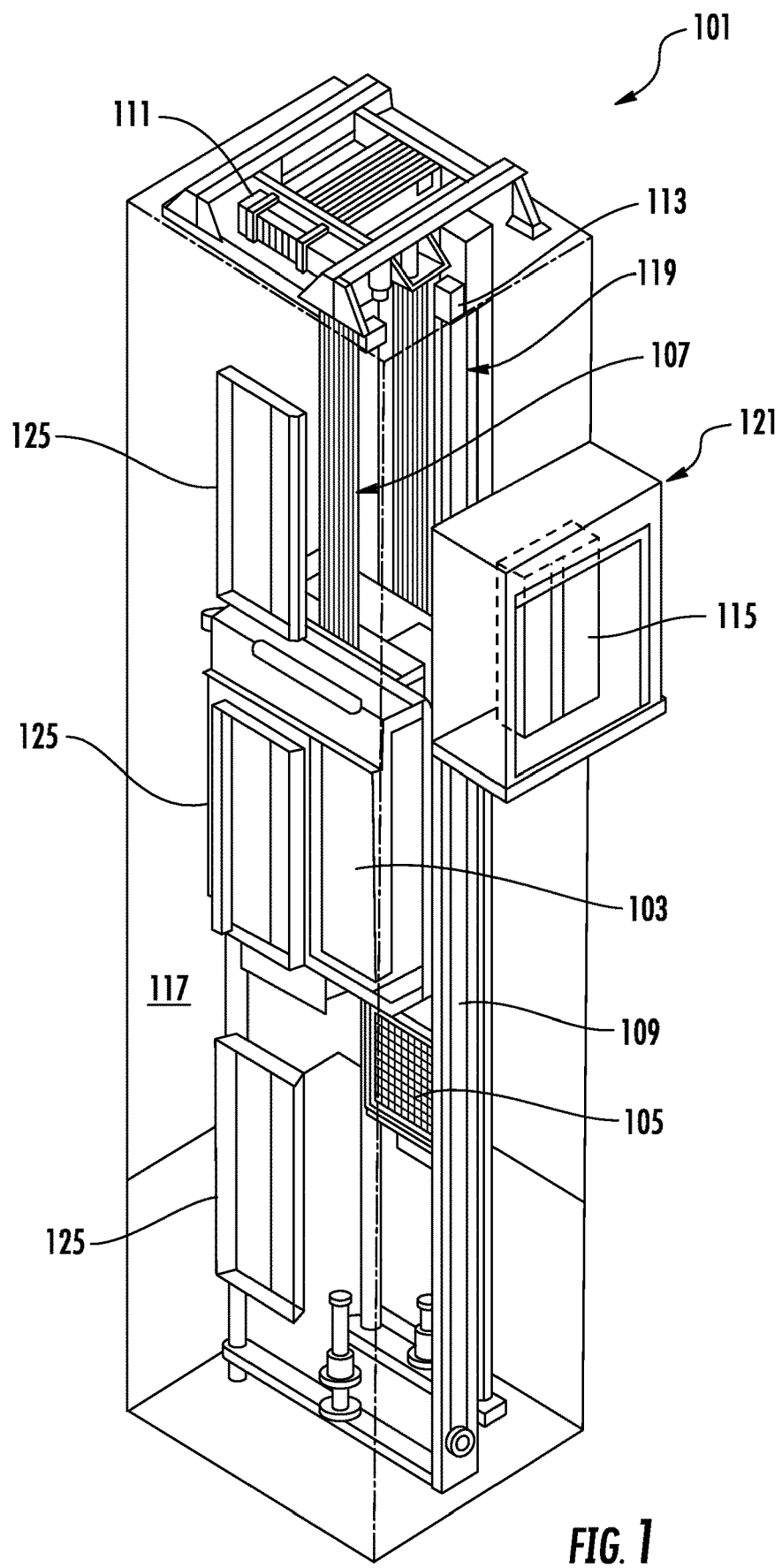
FIG. 1 is a schematic illustration of an elevator system that may employ various embodiments of the present disclosure.

FIG. 1 is a perspective view of an elevator system 101 including an elevator car 103, a counterweight 105, a roping 107, a guide rail 109, a machine 111, a position encoder 113, and an elevator controller 115. The elevator car 103 and counterweight 105 are connected to each other by the roping 107. The roping 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The roping 107 engages the machine 111, which is part of an overhead structure of the elevator system 101. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The elevator controller 115 is located, as shown, in a controller room 121 of the elevator shaft 117 and is configured to control the operation of the elevator system 101, and particularly the elevator car 103. For example, the elevator controller 115 may provide drive signals to the machine 111 to control the acceleration, deceleration, leveling, stopping, etc. of the elevator car 103. The elevator controller 115 may also be configured to receive position signals from the position encoder 113. When moving up or down within the elevator shaft 117 along guide rail 109, the elevator car 103 may stop at one or more landings 125 as controlled by the elevator controller 115. Although shown in a controller room 121, those of skill in the art will appreciate that the elevator controller 115 can be located and/or configured in other locations or positions within the elevator system 101.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. Although shown and described with a roping system, elevator systems that employ other methods and mechanisms of moving an elevator car within an elevator shaft may employ embodiments of the present disclosure. FIG. 1 is merely a non-limiting example presented for illustrative and explanatory purposes. It should be understood that the car operating panels as described herein may be used in any type of system where information and subsequent interaction or input is desired from a user.

Figure 2:
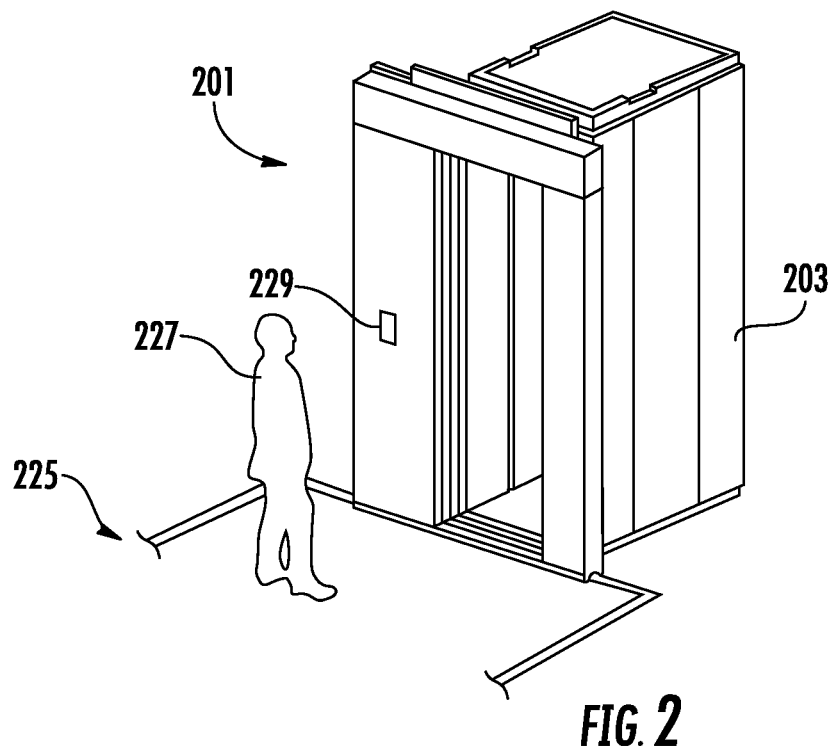
FIG. 2 is a schematic illustration of a landing floor of an elevator system with a hall call panel that may employ various embodiments of the present disclosure.

FIG. 2 is a schematic illustration of an elevator system 201 that may incorporate embodiments disclosed herein. As shown in FIG. 2, an elevator car 203 is located at a landing 225. The elevator car 203 may be called to the landing 225 by a passenger 227 that desires to travel to another floor within a building. The passenger 227 can call the elevator car 203 by pressing a call button on a hall call panel 229. The hall call panel 229 is in operable communication with an elevator controller (e.g., elevator controller 115 of FIG. 1) and can make a request such that an elevator car 203 will stop at the landing 225. The hall call panel 229 can be used to request travel in a desired direction (e.g., up or down), as known in the art. When the elevator car 203 reaches the landing 225, one or more elevator doors, including elevator car doors and landing doors, may open, allowing the passenger 227 to enter or exit the elevator car 203.

Figure 3:
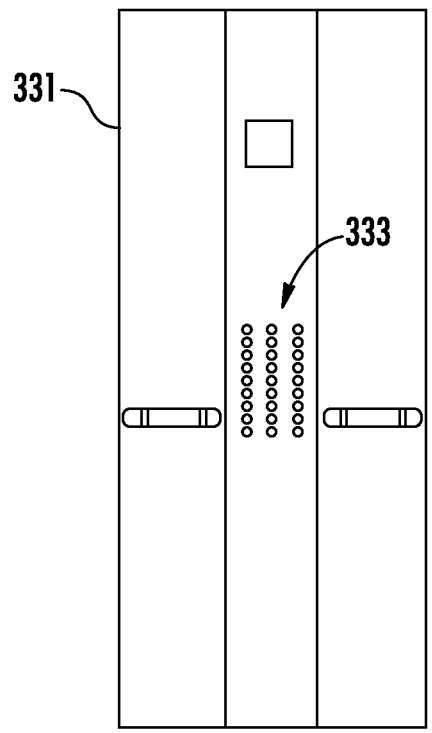
FIG. 3 is a schematic illustration of a car wall panel of an elevator system with a car operating panel that may employ various embodiments of the present disclosure.

FIG. 3 is a schematic illustration of an elevator car wall 331 that includes a car operating panel 333. The car operating panel 333, in traditional elevator system configurations, is a fixed, usually flat, and static operating panel that enables passengers to select floors to travel within a building and/or provide other operation (e.g., maintenance operations, emergency operations, etc.). That is, the car operation panel 333 may include one or more physical or mechanical buttons that are preset and fit with a particular physical layout. Typically, the car operating panel 333 is a standard component that can be installed in any number of locations (e.g., various different buildings) without much modification.

Due to the typical layout and static nature of car operating panels, when a passenger enters an elevator car, the passenger may not be able to determine what is located at each level/floor of the building. For example, typically tenant information or other floor related information is provided at the ground floor/lobby on one or more displays (digital or otherwise), and the passengers must determine what floor they are seeking prior to entering the elevator car. Further, because of the location of such information, it may be difficult for a passenger to travel to an appropriate floor from a non-ground/non-lobby floor. One solution to such problems may be provided by engraving information on the car operating panel, or providing removable placards. However, there may not be enough space to provide all relevant information and/or if a tenant or information regarding a floor changes, it can be difficult or costly to update such static information indicators.

Embodiments provided herein are directed to digital information indicators that can be customized to provide updatable information to passengers located within an elevator car. For example, in some embodiments, a digital readable marker that is located on a car operating panel can be provided in order to allow passengers to obtain floor information associated with the various floors that are accessible by the elevator car. In some embodiments, passengers equipped with portable systems can obtain digital information in the form of augmented reality that is displayed on a user device display (e.g., a phone screen, a tablet screen, and/or electronic wearable devices such as watches, glasses, etc.). The floor information can include information regarding persons, tenants, companies, businesses, services, etc. that are located at each of the floors. Further, the floor information can include expanded information associated with the persons, tenants, companies, businesses, services, etc., which may be obtainable through interaction with the user device (e.g., selecting one or more icons on the display). Such expanded information can include hours of operation, services provided by the tenants or businesses of a floor, or additional information (e.g., menus of restaurants, lists of practitioners of a clinic, personnel of a business, services provided by a specific business, etc.). In some embodiments, the user device can further generate audio information to be projected from a speaker of the user device, with the audio information associated with the displayed floor information.

Figure 4:
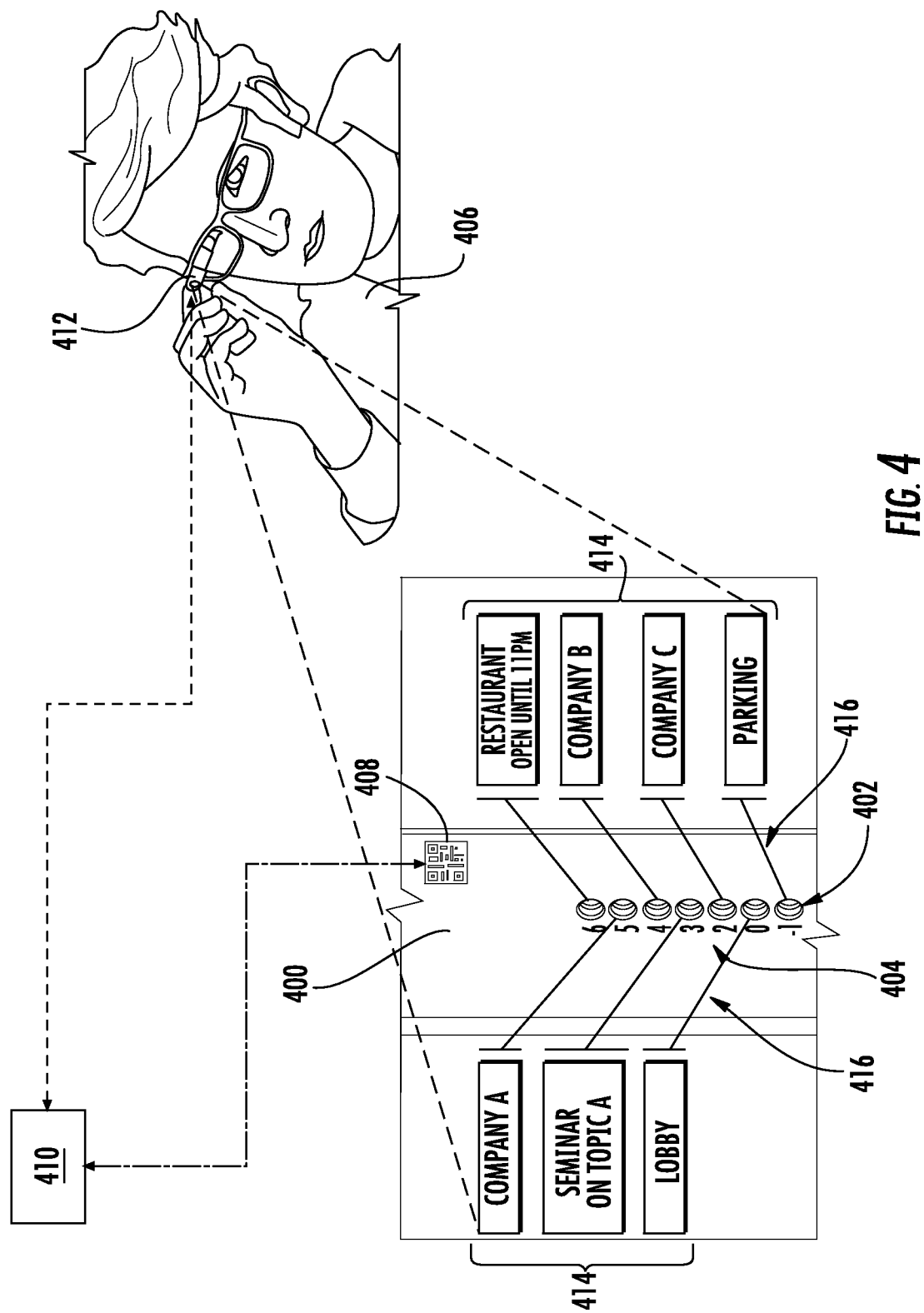
FIG. 4 is a schematic illustration of an elevator system and elevator car operating panel in accordance with an embodiment of the present disclosure.

Turning now to FIG. 4, a schematic illustration of a car operating panel 400 in accordance with an embodiment of the present disclosure is shown. The car operating panel 400 is a car operating panel of an elevator car of an elevator system, with the car operating panel 400 having a plurality of buttons 402 that enable passengers to select destination floors that are accessible by use of the elevator system. The buttons 402, as shown, have basic floor indicators 404 adjacent the respective buttons 402. For example, the basic floor indicators 404 can include alpha-numerical indicators that indicate a floor number within a building (e.g., L is the lobby, 2 is the second floor, 1B is the first subfloor or basement, etc.). As will be apparent, such basic floor indicators 404 do not indicate to a passenger 406 within the elevator car what is located at each of the floors. Rather, the passenger 406 must know where they intend to go prior to entering the elevator car.

However, as shown in FIG. 4, the car operating panel 400 of the present embodiment includes a digital readable marker 408. The digital readable marker 408 may be a barcode, a matrix barcode (e.g., QR code), a two-dimensional code, a scannable image, alphanumeric code, or other digital readable code, marking, or image as will be appreciated by those of skill in the art. The digital readable marker 408 is a code that is assigned specific floor information that is obtainable from a digital storage system 410 (e.g., a computer, cloud storage, or other digital media storage device or system). The floor information associated or obtainable from the digital storage system 410 can include directory information and expandable information, as described herein. When the digital readable marker 408 is scanned or otherwise read by a digital device 412 (hereinafter "user device"), the user device 412 will download the floor information from the digital storage system 410. The user device 412, shown in FIG. 4, is a set of digital glasses, however, those of skill in the art will appreciate that the user device of the present disclosure can be a phone, a tablet, an electronic wearable device (e.g., watches, glasses, etc.) or other digital user device that includes a screen or other ability to display information that is downloaded to the user device (e.g., display through projection, augmented reality, etc.).

The user device 412 can include a camera or other image capturing component for capturing an image of the digital readable marker 408. Further, the user device 412 can include a processor or other electronic components to enable processing and communication. For example, a user device 412 can include a processing chip that can process an image captured by the camera of the user device 412 and extract pertinent information to enable a request to be made to the digital storage system 410, e.g., using local wireless connections (e.g., Bluetooth®, Wi-Fi, near-field communication, etc.), cellular data communications, or other wireless communication. The request from the user device 412 to the digital storage system 410 can trigger the digital storage system 410 to transmit information and/or data to the user device 412. The processor of the user device 412 can then process the received information/data to generate a display or image on or with the user device 412 to display information to the passenger 406.

As shown in FIG. 4, when the user device 412 is used to scan the digital readable marker 408, a display of the user device 412 can generate displayed information 414 to be displayed to the passenger 406. The displayed information 414 can be an augmented reality display that is shown over the actual car operating panel 400. The displayed information 414 provides written words, text, images, etc. to the passenger 406 regarding each of the floors of the building that are accessible by the elevator car. In some embodiments, the displayed information 414 can be accompanied by audio information that is projected from one or more speakers of the user device 412. As shown, each item of the displayed information 414 is associated with a specific button 402, with the displayed information 414 having a digital indicator line 416 that connects an element of the displayed information with a specific button 402. As such, the passenger 406 can readily obtain specific information for each of the floors that are accessible by the elevator.

Figure 5A:
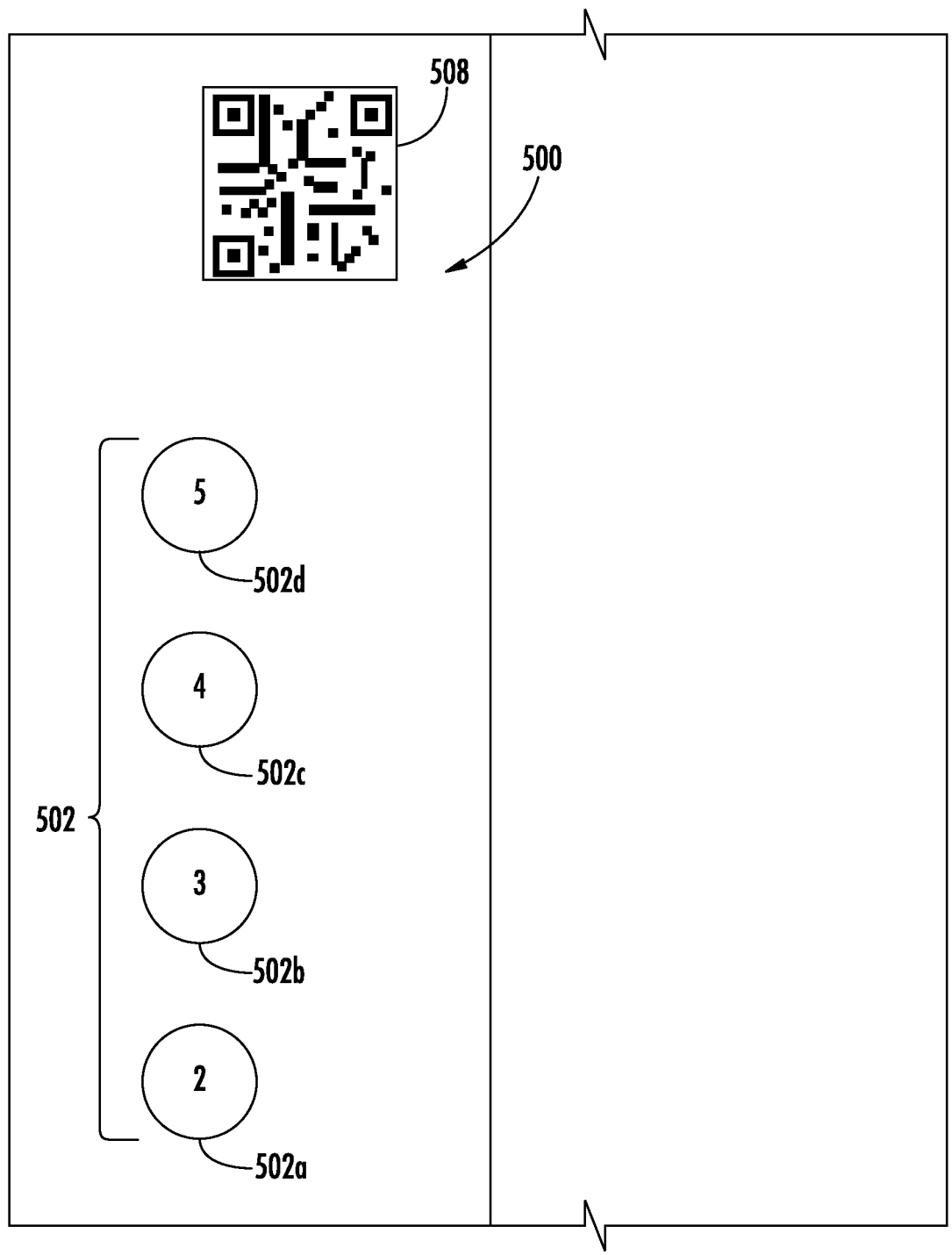
FIG. 5A is a schematic illustration of a car operating panel in accordance with an embodiment of the present disclosure.
Figure 5B:
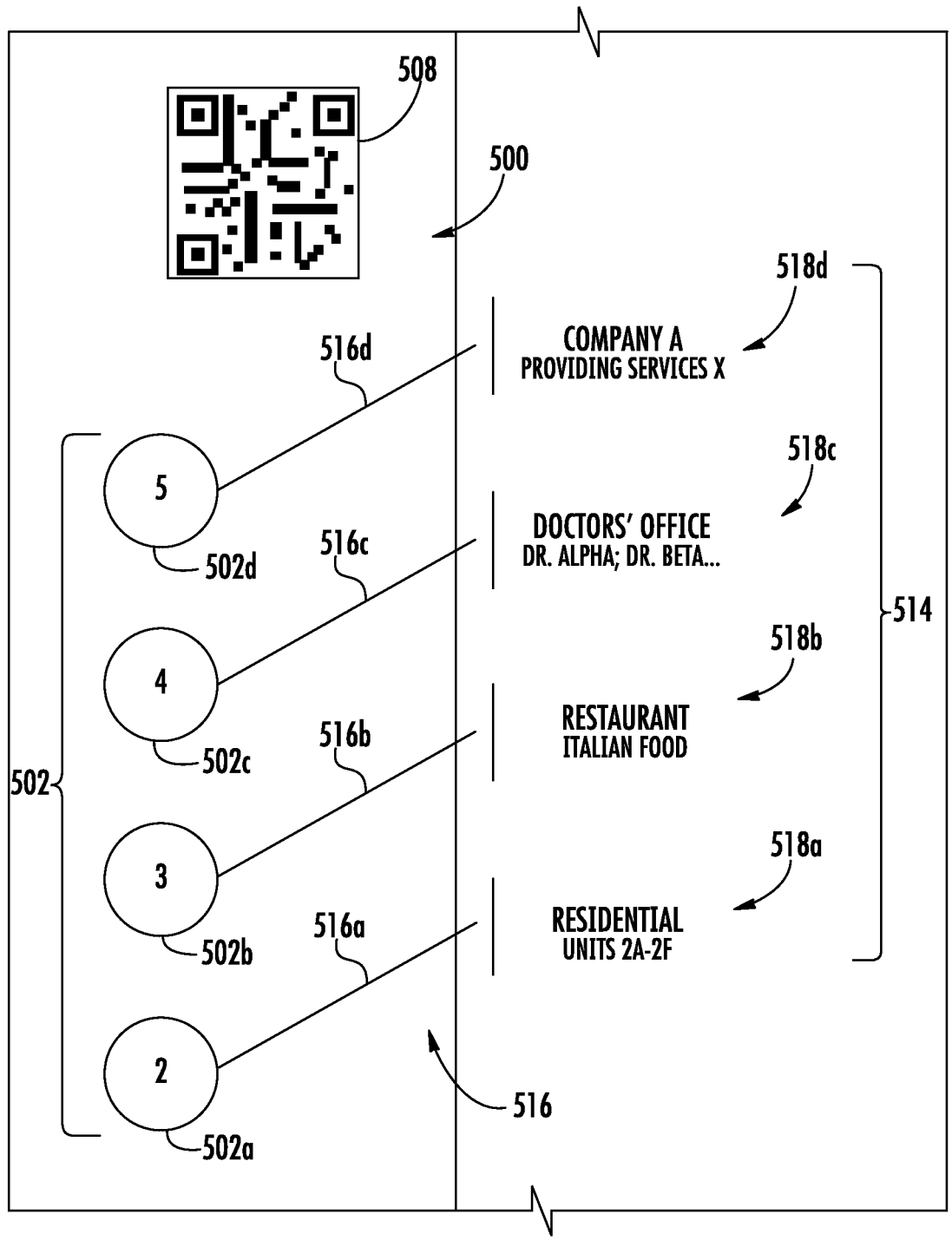
FIG. 5B is a schematic illustration of the car operating panel of FIG. 5A illustrating a display by a user device in accordance with an embodiment of the present disclosure.
Figure 5C:
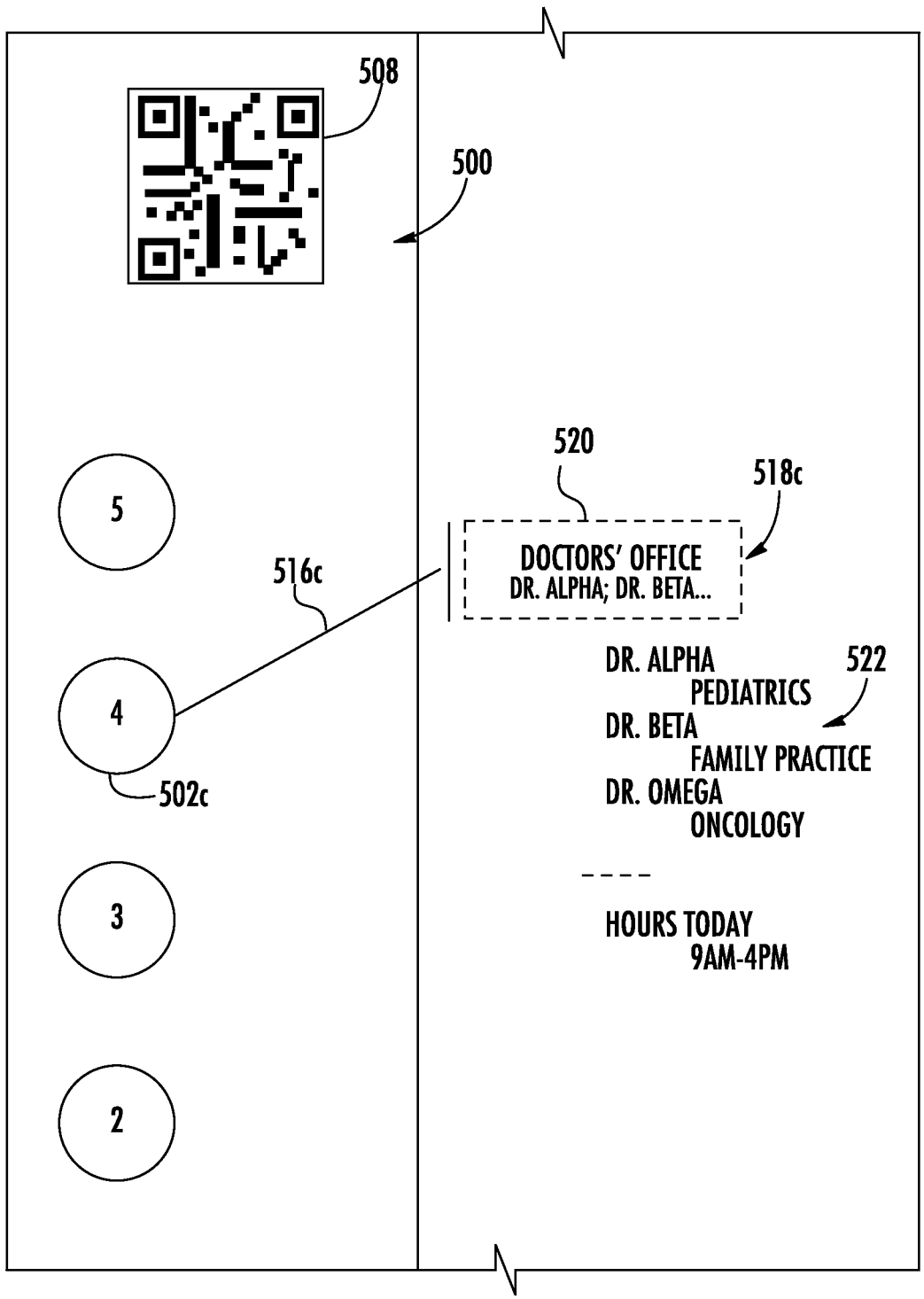
FIG. 5C is a schematic illustration of the car operating panel of FIG. 5A illustrating another display by a user device in accordance with an embodiment of the present disclosure.

Turning now to FIGS. 5A-5C, example illustrations of a car operating panel 500 in accordance with an embodiment of the present disclosure are shown. As shown in FIG. 5A, the car operating panel includes buttons 502 for operation by a passenger to select a destination floor, with each button having basic floor indicators thereon (or adjacent thereto). As shown, a first button 502a has the number "2" thereon indicating a second floor of the building as a destination, a second button 502b has the number "3" thereon indicating a third floor of the building as a destination, a third button 502c has the number "4" thereon indicating a fourth floor of the building as a destination, and a fourth button 502d has the number "5" thereon indicating a fifth floor of the building as a destination. Those of skill in the art will appreciate that any number of buttons with associated basic floor indicators can be present on a car operating panel of an elevator system. The basic floor indicators of the buttons 502 do not provide any information to a passenger regarding what or who is located at each of the respective floors. The car operating panel 500 further includes a digital readable marker 508 that is readable by a user device, as described above.

As shown in FIG. 5B, when a passenger scans or reads the digital readable marker 508 using a user device, the user device can display various images and/or information on a screen or projected therefrom to enable a passenger to obtain additional information regarding each of the floors. For example, FIG. 5B illustrates a view as generated on a screen of a user device. Such view may be an augmented reality that overlays digital images/information onto a captured/live image of the car operating panel 500.

In practice, the user device scans the digital readable marker 508 and receives information from a remote digital storage system. The information received from the remote digital storage system can include information for generating images or other pictures on a screen of the user device and/or audio information. The received information is associated with an elevator car in which the digital readable marker 508 is located, as described herein.

The user device will then generate the view as shown in FIG. 5B. For example, a series of digital indicator lines 516 will extend from the location of the buttons 502 with various displayed information 514 being located at the ends of the digital indicator lines 516. In the example of FIG. 5B, the displayed information 514 includes directory information element 518a, 518b, 518c, 518d associated with each button 502a, 502b, 502c, 502d. The directory information elements 518a, 518b, 518c, 518d may be information of each floor associated with a button 502.

For example, as shown, first directory information element 518a indicates that "Residential" is located on the second floor, which is selectable by operating the first button 502a. The first directory information element 518a further includes optional additional information, such as indicating that "Units 2A-2F" of the residences on floor 2 are located on floor 2. Second directory information element 518b indicates that a restaurant serving Italian food is located on the third floor, third directory information element 518c indicates a doctors' office having Drs. Alpha and Beta practicing there, and fourth directory information element 518d indicates that Company A is located on the fifth floor with an indication that Company A provides "Services X." As such, a passenger can obtain detailed information regarding each of the floors accessible by the elevator system. The passenger can readily determine which directory information element 518a, 518b, 518c, 518d is associated with each button 502a, 502b, 502c, 502d by the digital indicator lines 516a, 516b, 516c, 516d which provide a digital image or line connecting the directory information element 518a, 518b, 518c, 518d with the respective button 502a, 502b, 502c, 502d.

In some embodiments, the directory information elements 518a, 518b, 518c, 518d can be interactive. That is, the directory information elements 518a, 518b, 518c, 518d can be digital selective interactive elements that are displayed by the user device. In such embodiments, the selection of a directory information element 518a, 518b, 518c, 518d can generate expandable information as shown in FIG. 5C. In FIG. 5C, a passenger has selected the third directory information element 518c to obtain additional information regarding the Doctors' Office.

As shown in FIG. 5C, a selection indicator 520 outlines the third directory information element 518c to indicate that the user has selected the third directory information element 518c for additional information. Once selected, expanded information 522 is displayed providing even more information regarding the selected directory information element and the associated floor of the building. As shown, additional doctors are displayed in the expanded information, various practice areas for the specific doctors, and hours of operation are also displayed in the expanded information 522. In this embodiment, once one of the directory information elements 518a, 518b, 518c, 518d is selected, the others of the directory information elements 518a, 518b, 518c, 518d disappear, become hidden, or fade to less prominent display (e.g., lighter or less visible). However, in other embodiments, the expanded information can be displayed adjacent to the selected directory information element without impacting the display of the other directory information elements.

Figure 6:
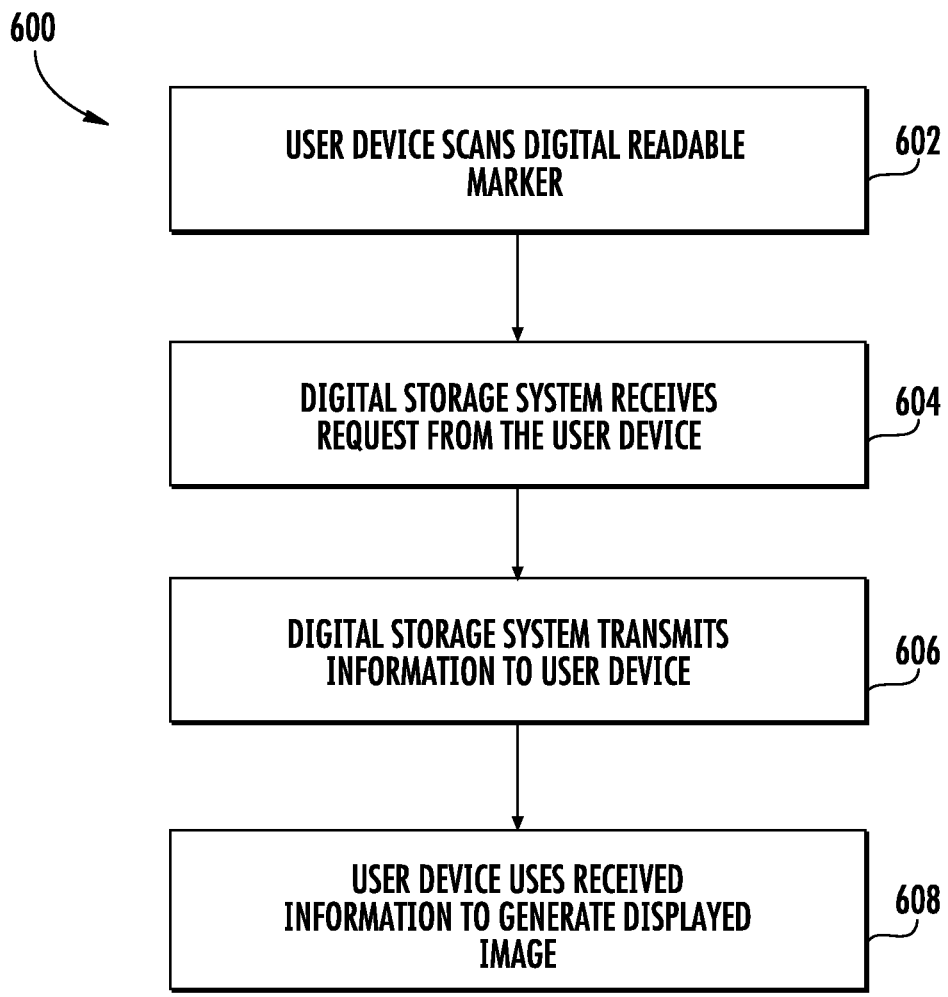
FIG. 6 is a flow process for providing information to a passenger within an elevator car in accordance with an embodiment of the present disclosure.

Turning now to FIG. 6, a flow process 600 in accordance with an embodiment of the present disclosure is shown. The flow process 600 may be performed by elevator systems as shown and described herein, and/or variations thereon.

At block 602, a user device is used to scan or read a digital readable marker located within an elevator car. The user device can be a phone, a tablet, an electronic wearable device (e.g., watches, glasses, etc.), or other digital user device that includes a screen or other ability to display information that is downloaded to the user device (e.g., display through projection, augmented reality, etc.). The user device will generate and transmit a request to a remote digital storage system, such as remote computer, server, etc. as will be appreciated by those of skill in the art.

At block 604, the digital storage system will receive the request from the user device.

At block 606, in response to the received request from the user device, the digital storage system will transmit information to the user device. Such information includes display information to enable display of information by the user device for the user/passenger within the elevator car. The information further includes data or information associated with one or more of the floors accessible by the elevator system. In some embodiments, the information can include directory information and/or expandable information to provide detailed information to the passenger through a display from the user device. In some non-limiting embodiments, the information transmitted from the digital storage system can include audio information for audio playback by the user device making the request. The audio information can be associated with the directory information and/or expandable information.

At block 608, the user device uses the information received from the digital storage device to generate displayed information (e.g., augmented reality) to provide information to the passenger. In some embodiments, the displayed information can include interactive elements which can prompt additional requests from the user device to the digital storage system. In embodiments where audio information is provided from the digital storage system, the user device can generate audio based on such information.

Advantageously, embodiments provided herein are directed to providing additional information to passengers in elevator cars on demand. The readable digital codes provided herein enable a user device to display information (static or interactive) that is beyond typical information provided on a car operating panel of an elevator car. The displayed information can be presented in the form of an augmented reality display with the user device.

Further, advantageously, embodiments provided herein enable a building system administrator or other person to change the information provided to a passenger. For example, the displayed information can be dynamic and change based on a day of the week, time of day, or based on changing tenants of a building. As discussed above, information can include hours of operation, which can be dependent on the day or time, and if a business is closed, such information can be provided to a passenger. Further, some information can include menus or lists of information (e.g., services, goods, etc.) that may be obtainable at a given location within a building.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. An elevator system comprising:
   an elevator car located within an elevator shaft, the elevator car moveable between a plurality of floors of a building;
   a car operating panel located within the elevator car and having a plurality of buttons operable for selection of a destination floor of the plurality of floors;
   a digital readable marker located within the elevator car that is at least one of scannable and readable by a user device; and
   a digital storage system having information stored thereon, the information including directory information, wherein the directory information includes information associated with the floors selectable by operation of the plurality of buttons;
   wherein, when the user device scans or reads the digital readable marker, the digital storage system transmits the directory information to the user device so that the user device can display the directory information to a passenger,
   wherein the displayed directory information on the user device includes a plurality of directory information elements associated with each of the plurality of buttons,
   wherein the information transmitted from the digital storage system further includes expandable information to provide additional information displayed by the user device, and
   wherein the plurality of directory information elements are interactive so that a selection of any of the plurality of directory information elements generates the expandable information.

2. The elevator system of claim 1, wherein the information stored on the digital storage system is updatable based on changes related to each of the plurality of floors.

3. The elevator system of claim 1, wherein the information transmitted from the digital storage system includes information to enable augmented reality display of the directory information.

4. The elevator system of claim 1, wherein the information transmitted from the digital storage system includes data enabling interactive elements to be displayed by the user device.

5. The elevator system claim 1, wherein the digital readable marker is located on the car operating panel.

6. The elevator system of claim 1, wherein the information stored on the digital storage system and transmitted to the user device includes audio information associated with the directory information, wherein the user device can generate audio based on received audio information.

7. The elevator system of claim 1, wherein the digital readable marker is at least one of a barcode, a matrix barcode, a two-dimensional code, a scannable image, and an alphanumeric code.

8. A method of providing information associated with an elevator system to a passenger within an elevator car, the method comprising:
   installing a digital readable marker within the elevator car;
   storing information associated with at least one floor of a plurality of floors of a building on a digital storage system;
   receiving a request from a user device when the user device reads or scans the digital readable marker; and
   transmitting information to the user device in response to the request, wherein the information includes directory information to be displayed by the user device for a passenger within the elevator car,
   wherein the displayed directory information on the user device includes a plurality of directory information elements associated with each of the plurality of buttons,
   wherein the information transmitted from the digital storage system further includes expandable information to provide additional information displayed by the user device, and
   wherein the plurality of directory information elements are interactive so that a selection of any of the plurality of directory information elements generates the expandable information.

9. The method of claim 8, wherein the information stored on the digital storage system is updatable based on changes related to each of the plurality of floors.

10. The method of claim 8, wherein the information transmitted from the digital storage system includes information to enable augmented reality display of the directory information.

11. The method of claim 8, wherein the information transmitted from the digital storage system includes data enabling interactive elements to be displayed by the user device.

12. The method of claim 8, wherein the digital readable marker is located on a car operating panel of the elevator car.

13. The method of claim 8, wherein the transmitted information includes audio information associated with the directory information, wherein the user device can generate audio based on received audio information.

* * * * *